(12) United States Patent
Drewe et al.

(10) Patent No.: US 7,705,499 B2
(45) Date of Patent: Apr. 27, 2010

(54) DEVICE FOR MAINTAINING THE POSITION OF A ROTATABLY OR DISPLACEABLY MOUNTED SHAFT

(75) Inventors: Ingo Drewe, Buehl (DE); Christian Meyer, Karlsruhe-Wolfartsweier (DE); Guido Schneider, Witten (DE)

(73) Assignee: Robert Bosch GmbH (DE)

( * ) Notice: Subject to any disclaimer, the term of this patent is extended or adjusted under 35 U.S.C. 154(b) by 821 days.

(21) Appl. No.: 10/573,465

(22) PCT Filed: Jun. 9, 2004

(86) PCT No.: PCT/DE2004/001193

§ 371 (c)(1),
(2), (4) Date: Oct. 26, 2006

(87) PCT Pub. No.: WO2005/040630

PCT Pub. Date: May 6, 2005

(65) Prior Publication Data

US 2007/0108003 A1    May 17, 2007

(30) Foreign Application Priority Data

Sep. 24, 2003   (DE) ............................... 103 44 211

(51) Int. Cl.
*H02K 7/00*   (2006.01)

(52) U.S. Cl. .................................. 310/75 D; 310/75 A (58) Field of Classification Search ............... 310/75 D, 310/75 A, 91
See application file for complete search history.

(56) References Cited

U.S. PATENT DOCUMENTS 2,500,175 A * 3/1950 Guthrie ..................... 310/75 D
4,156,817 A * 5/1979 Preece et al. .............. 290/38 R
4,573,423 A   3/1986 Dumortier

FOREIGN PATENT DOCUMENTS

| DE | 30 28 012 | 2/1982 |
| DE | 30 30 767 | 2/1982 |
| DE | 38 09 555 | 7/1989 |
| EP | 0 965 764 | 12/1999 |
| JP | 60-237230 | 11/1985 |

* cited by examiner

*Primary Examiner*—Dang D Le
(74) *Attorney, Agent, or Firm*—Michael Best & Friedrich LLP

(57) ABSTRACT

Device for maintaining the position of a rotatably or displaceably mounted shaft, particularly an armature shaft (11) of an electric motor (9), wherein a gripping body (26) is arranged around the shaft (11), and said gripping body is impinged upon by a force (54, 56) in order to form a friction closure between the gripping body (26) and the surface (44) of the shaft (11), wherein the force (54, 56) for maintaining the position is provided by an actively actuated control member (30, 62, 70, 80) that is connected at least to one end (38, 40, 74) of the gripping body (26).

19 Claims, 7 Drawing Sheets

DEVICE FOR MAINTAINING THE POSITION OF A ROTATABLY OR DISPLACEABLY MOUNTED SHAFT

BACKGROUND OF THE INVENTION

The invention relates to a device for maintaining the position of a rotatably or displaceably mounted shaft, in particular an armature shaft.

DE 30 30 767 C2 disclosed a safety crank for manually operated lifting apparatuses with an automatic reverse safety. In this case, arranged between the crank and a housing surrounding it is a double action helical spring locking mechanism, which automatically prevents the crank from turning back when the lifting apparatus is in a load state. This type of load moment locking device has the disadvantage that it is only triggered starting at a design-dependent load threshold. For example, there is no possibility of blocking the shaft in an unloaded state to be rotationally secured. In addition, this type of described safety device is not suitable for maintaining the position of a freely mounted shaft, such as an armature shaft of an electric motor for example, in which no coaxial housing wall is available in the direct vicinity of the surface of the shaft.

SUMMARY OF THE INVENTION

The device in accordance with the invention for maintaining the position of a rotatably or displaceably mounted shaft has the advantage that the shaft can be reliably secured at any time in a motor-operated manner against turning, independent of the operating mode and the load moment.

This type of active rotation safety device can be used independent of the formation of the housing of the shaft bearing even with low requirements for construction space, wherein the shaft can be continuously secured in every position without the manual expenditure of force. The expenditure of force for the holding moment of the shaft can be adjusted to various applications of the electric motor via the selection of the number of wrappings of the gripping body.

The use of a wrap-around band or a helical spring as a gripping body can generate a relatively great locking moment via a low expenditure of force on the two ends of the gripping body due to the relatively large friction surface. In this case, the wear of such a wrap-around band or helical spring is relatively low, which leads to a long service life for the locking device.

If the surface of the shaft or the gripping body is coated with a material with a high coefficient of friction, for example via vulcanization of said surface, the holding force to be applied can be reduced and consequently the dimensioning of the corresponding disengaging system, thereby saving energy and construction space.

A further reduction in the holding force can be achieved by using a double wrap-around band since in this case the holding force to be applied between the two free ends and the end with the loop is cut in half.

If the two free ends are guided through the loop of the third end, this reduces the axial construction length of the gripping body and therefore of the shaft length of an armature shaft, for example.

The gripping body can be embodied particularly favorably as a wire with a circular cross section, or else as a flat band in order to achieve a larger friction surface. In principle, any desired cross section can be used, wherein this has a jacket of a material with a high friction.

The control member for deflecting the at least one end of the gripping body is actuated advantageously by an electric, pneumatic or hydraulic disengaging system. Especially advantageous in this case is an electrically actuated lifting magnet or another electrically activated actuator such as a piezo element, for example.

In order to achieve a large deflection of the at least two ends of the gripping body in a short time, the disengaging system is equipped in an advantageous design with a double lift, wherein two control members can be adjusted at the same time—particularly in the opposite direction. This type of symmetrical deflection can be realized by means of a double lifting magnet for example.

In the case of another design, a wedge or an eccentric wheel, for example, can be arranged between the two ends of the gripping body, which deflects the two ends in an opposing direction with activation of the disengaging system.

In this connection, the control member can travel a linear adjustment path, for example when using a lifting magnet, or execute a rotational movement when using an eccentric wheel or a control member positioned on the shaft, during which force is also introduced on the ends of the gripping body.

The connection between the control member and the ends of the gripping body can be designed in such a way that the control member exerts either a tensile force or a compressive force on the spring-stiff gripping element.

As an alternative to the double lifting element, one end can also be fastened as a fixed bearing to a housing part of the shaft bearing so that the housing summons the corresponding counterforce to the actuator.

In a preferred embodiment, a restoring element of the control member is arranged in such a way that when applying current to the disengaging system, the control member is actuated against the spring force of the restoring element in such a way that a friction closure between the surface of the shaft and the gripping body is prevented. The advantage of this is that when the supply of current is interrupted the shaft is immediately secured against rotation or displacement since a friction closure is produced by the restoring element.

In an alternative embodiment the aforementioned principle can be precisely reversed so that, when applying current or voltage to the disengaging system, there is a friction closure between the surface and the gripping body and the shaft is freely moveable when the disengaging system is in a non-energized state.

If two separate disengaging systems are used for the two ends of the gripping body, depending upon the available construction space, they can either be arranged side by side axially or even axially in a plane, which makes it possible to reduce either the radial or axial construction size of the drive unit.

In another design, the two ends of the gripping body are impinged upon by a force in such a way that they exert a resulting force on the shaft, which deflects the shaft radially vis-à-vis a shaft bearing. Due to such tilting of the shaft against the bearing when actuating the disengaging system, the clamping effect is reinforced, thereby also reducing the force required for rotational security.

The invention also comprises a further-reaching embodiment, in which, as with a winding drum of a cable winch wound with multiple layers, the external pressure on the shaft continues to accumulate and increase due to the second, third and subsequent layers, whereby this effect is converted into an increase in efficiency of the system. In this embodiment at least one other gripping body or helical spring is located at the same axial but radially outlying position in such a way that the inside surface of said gripping body exerts an additional radial pressure on the surface of the shaft via the gripping body or helical spring that is lying radially underneath. Since the first windings generate the greatest friction closure forces, this type of radial, multiple arrangement benefits the relationship between axial construction size and the ability to maintain position. In addition to the increase in efficiency, due to the described radial multiple arrangement, there is also a reduction in the dependency of the ability to maintain position upon the relationship of the winding direction to the load direction.

BRIEF DESCRIPTION OF THE DRAWINGS

Various exemplary embodiments of a device in accordance with the invention are depicted in the drawings and explained in greater detail in the subsequent description. The drawings show.

DETAILED DESCRIPTION

Figure 1:
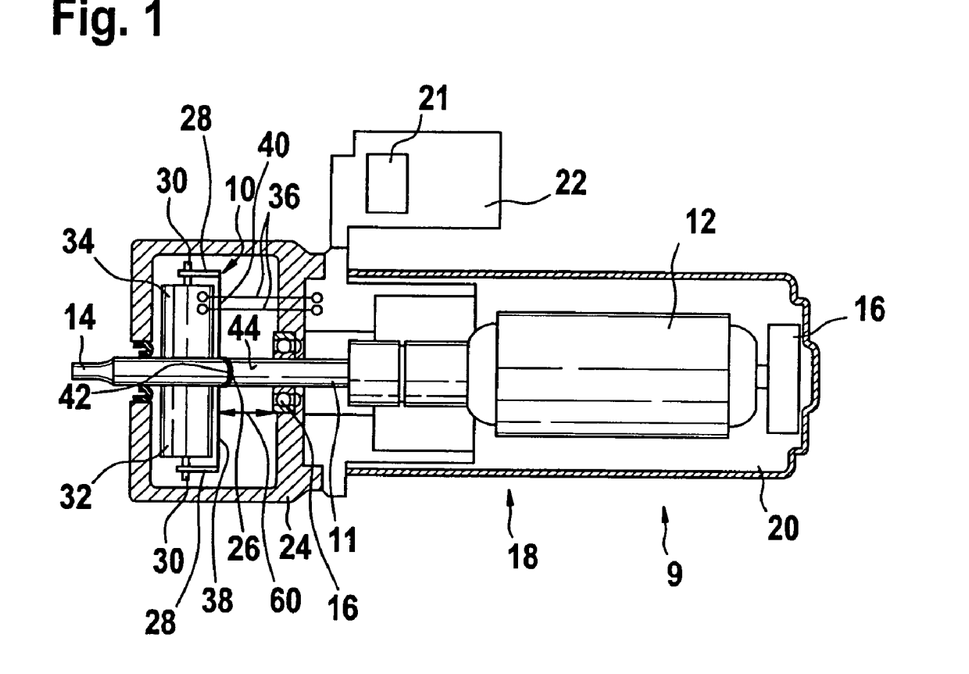
FIG. 1 A schematic representation of an electric motor with a device in accordance with the invention for maintaining position.
Figure 5:
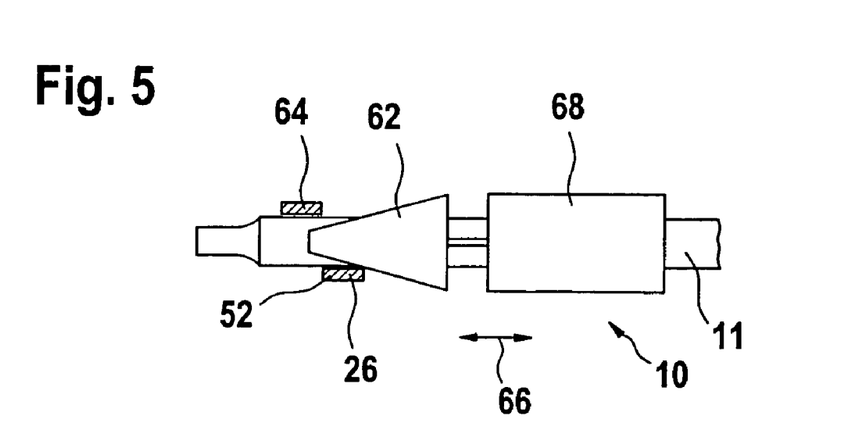

FIG. 1 depicts an electromotive adjusting drive 9, for example for adjusting movable parts in a motor vehicle, with an armature 12 and an output element 14. The armature 12 is arranged on an armature shaft 11, which is positioned in a housing 18 of the drive device 9 by means of bearings 16. The housing 18 includes for example a pole pot 20 for the armature 12, an electronic housing 22 for a corresponding electronic unit 21 and gear 24 to accommodate gear components. In order to be able to lock the motor 9 at any time in any position, a gripping body 26 is wound around the armature shaft 11, which gripping body is connected via connecting elements 28 to control members 30, which can be adjusted electrically by means of a disengaging system 32. The disengaging system 32 in FIG. 1 features a double lifting magnet 34, which is connected by means of electrical connections 36 to the electronic unit 21, which can produce or interrupt the flow of current of the lifting magnets 34. If, for example, with an electric activation of the double lifting magnet 34, the two control members 30 are pressed radially towards the outside, the two ends 38, 40 of the gripping body 26 will also be deflected in an opposing direction radially towards the outside, whereby the one gripping body 26 forming a loop 42 is pulled tight and a friction closure forms with the surface 44 of the armature shaft 11. If the supply of current is interrupted, readjusting springs 46 arranged in the lifting magnet 34 reset the control members 30, thereby expanding the loop 42 so that the armature shaft 11 can continue to rotate undisturbed within the gripping body 26. The gripping body 26 is manufactured for example as a helical spring 48 of metallic spring wire, which has a circular cross section 50 (FIG. 9) or a square cross section 52 (FIG. 5).

In an alternative design, the functional principle of the device for maintaining the position can also be reversed in that in a non-energized state the disengaging system 32 holds the gripping body 26 in a friction closure to the surface 44 of the armature shaft 11 and the friction closure is released in an electrically active state.

Figure 2:
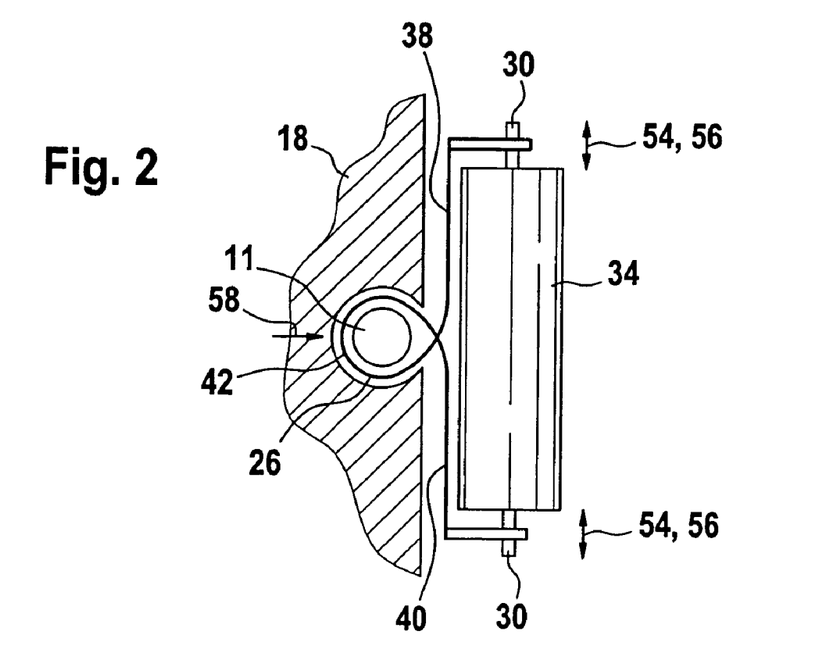
FIG. 2 Side view in accordance with FIG. 1.

FIG. 2 shows a side view of the same device, wherein in this case the loop 42 of the gripping body 26 is guided in the housing 18 in such a way that, in a relaxed state, the loop 42 does not rub on the shaft 11. The lifting magnet 34 is arranged in such a way that a compressive force 54 acts on the connecting elements 28 of the gripping body 26 in order to produce a friction closure, and the corresponding restoring elements 46 pull back the control members 30 again. If the disengaging system 32 is arranged spaced apart radially next to the shaft 11, when pulling the gripping body 26 tight a resulting radial force 58 also occurs, which tilts the shaft 11 via a lever 60 vis-à-vis the bearing 16.

Figure 3:
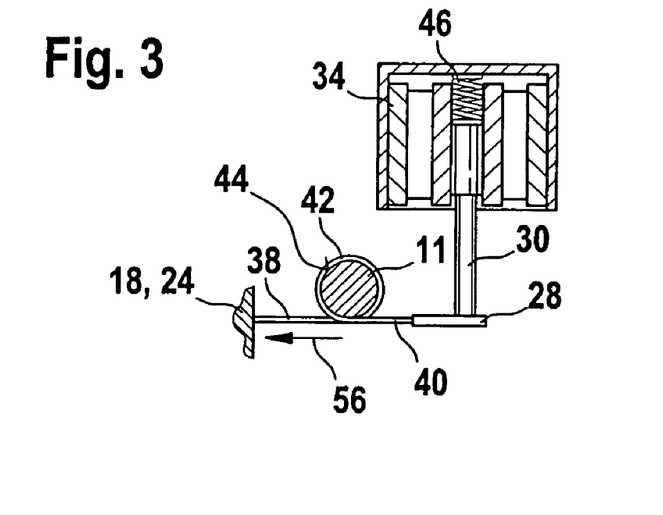
FIG. 3 A section through a lifting magnet of a disengaging system in accordance with the invention.

In FIG. 3, the first end 38 of the gripping body 26 is solidly fastened to the housing 18 and only the second end 40 is connected to the control member 30 of a simple lifting magnet 34. In this case, the housing 18 absorbs the tensile force 56, whereby, however, the adjusting path of the control member 30 is correspondingly lengthened in order to produce a corresponding adhesive friction between the loop 42 and the surface 44. The control member 30 is pulled into the energized electromagnet 34 (shown in cross section) in order to actuate the engine brake. In order to release the device for maintaining the position 10, the control member 30 is pressed out of the magnet 34 again by means of the readjusting spring 46 after the current is turned off.

Figure 4:
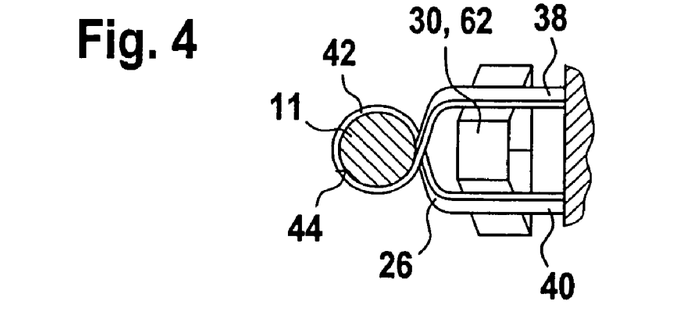
FIGS. 4 to 6 Various embodiments of control members of a device for maintaining position.

In FIG. 4 the control member 30 is embodied as a wedge 62, which is pushed between the two fixed ends 38, 40 of the gripping body 26. The gripping body 26 is embodied here for example as a flat band 64, which is pressed as a function of the position of the wedge 62 more or less strongly against the surface 44 of the shaft 11 in order to produce a friction closure.

As FIG. 5 depicts, the wedge 62 is adjusted for example by means of an electrical actuator 68, which adjusts the control member 30 either actively in both directions 66 or the control member 30 is reset in one direction also by means of a restoring element 46.

Figure 6:
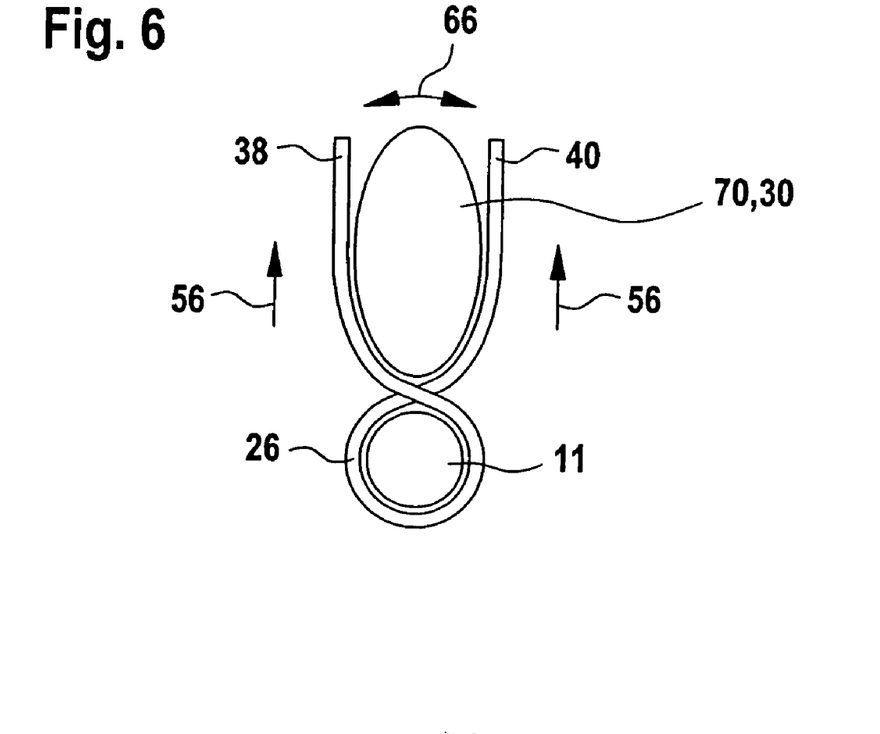

In FIG. 6 the control member 30 is embodied as an eccentric disk 70, which through a rotation by the disengaging system 31 also generates a tensile force 56 on both ends 38 and 40 of the gripping body 26, thereby producing a friction closure between the loop 42 and the surface 44. The loop body 26 in this case also has elastic properties, which when the eccentric disk 70 is reset (actively or via readjusting springs 46) brings about the release of the loop 42 and therefore the free running of the shaft 11.

Figure 7:
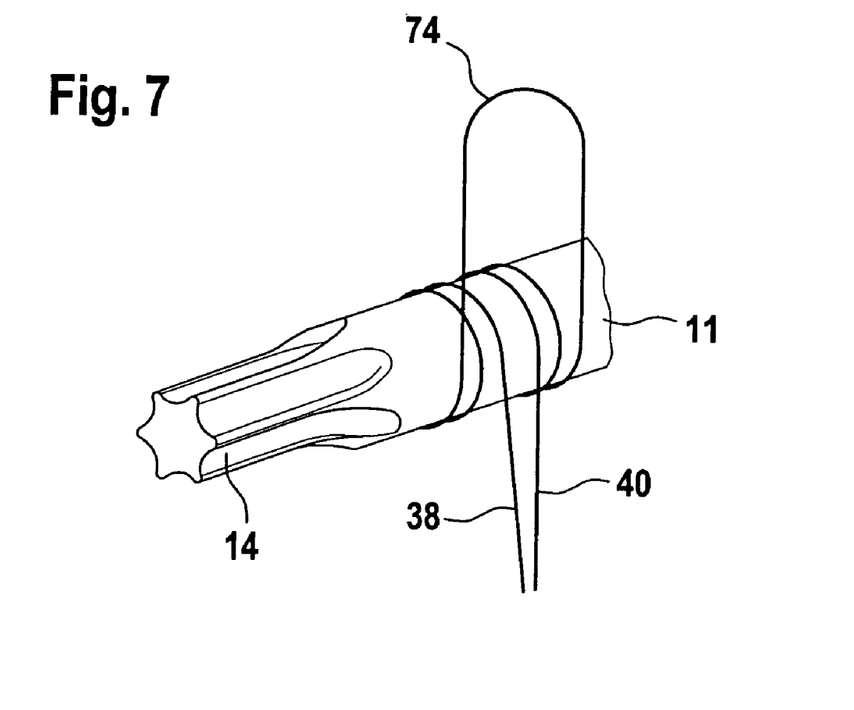
FIGS. 7 to 10 Various designs and positions of a gripping body.

FIG. 7 shows a double wrap-around band 72 as a gripping body 26, where the wrap-around band winds around the shaft 11 in such a way that two free ends 38 and 40 as well as a third end 74 forming a loop 74 are produced. This type of arrangement can be combined with a disengaging system 32 analogous to FIGS. 1 through 6, wherein in this case a tensile force 56 must be applied to generate a friction closure, on the one hand, on the loop end 74 and, on the other hand, simultaneously on the two free ends 38 and 40. If, for example, the loop 74 is fixed, mounted on the housing, the tensile force 56 to be applied to the two free ends 38 and 40 is cut in half in accordance with the cable tension principle. The armature shaft 11 has a pinion 82 as an output element 14, which can accommodate a toothed wheel for example (not shown), which can adjust a moveable part via a mechanism (also not shown).

Figure 8:
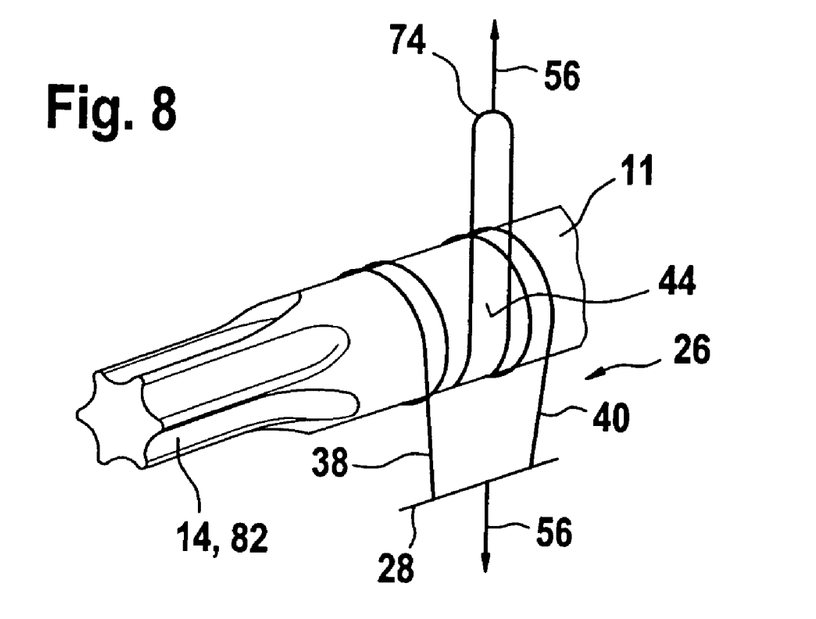

In a variation of the design according to FIG. 8, the two free ends 38 and 40 are pulled through the loop 74 of the third end, thereby reducing the axial extension of such a loop band 72. Also in this case, the ends 38 and 40 as well as 74 can optionally be fixed partially on the housing 18, or be pulled or shifted on all ends by means of a control member 30.

Figure 9:
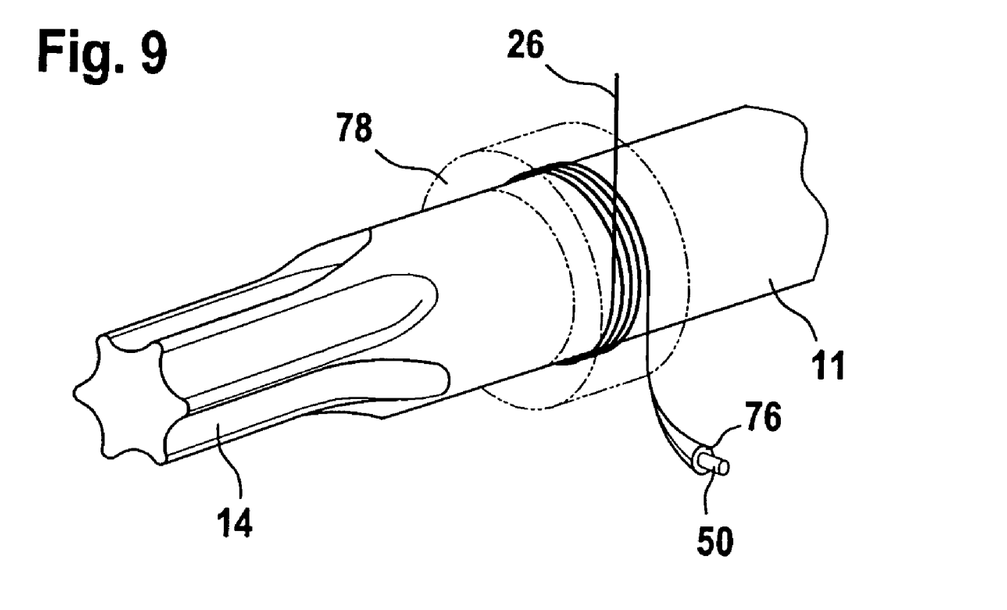

In another design according to FIG. 9, the wrap-around band 72 features a casing 76 around the circular wire core 50, which has a high coefficient of friction. This casing can be applied for example by vulcanization since good adhesion between the core 50 and the friction coating 76 is guaranteed with this method. Alternatively or additionally, the surface of the shaft 11 in one variation is embodied with a material or a surface structure 78 with high friction, preferably with a rubber sleeve that is resistant to torsion.

Figure 10:
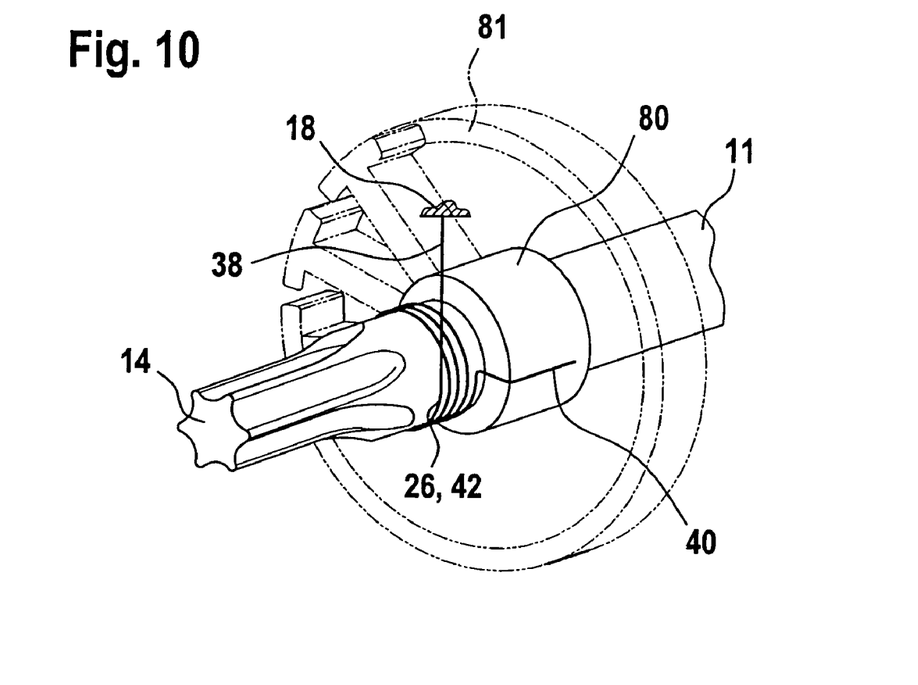

FIG. 10 shows an electromotively actuated control member 80, which is rotatably mounted on the shaft 11. In this case, for example, one end 38 of the gripping body 26 is fixed on the housing 18 and the second end 40 is fastened on the radial control member 80. In order to generate a friction closure, an armature packet 82 is arranged on the radial control member 80, which can be put into rotation by means of electromagnets (not shown), whereby the second end 40 that is fastened to the radial control member 80 is also rotated around the shaft 11, thereby pulling the loop 42 tight. In this case as well, the friction closure can be produced optionally in an electrically active or non-active state. In order to reduce the axial extension of the device for maintaining the position 10, the loop body 26 can also be arranged within the radial control member 80.

Figure 11:
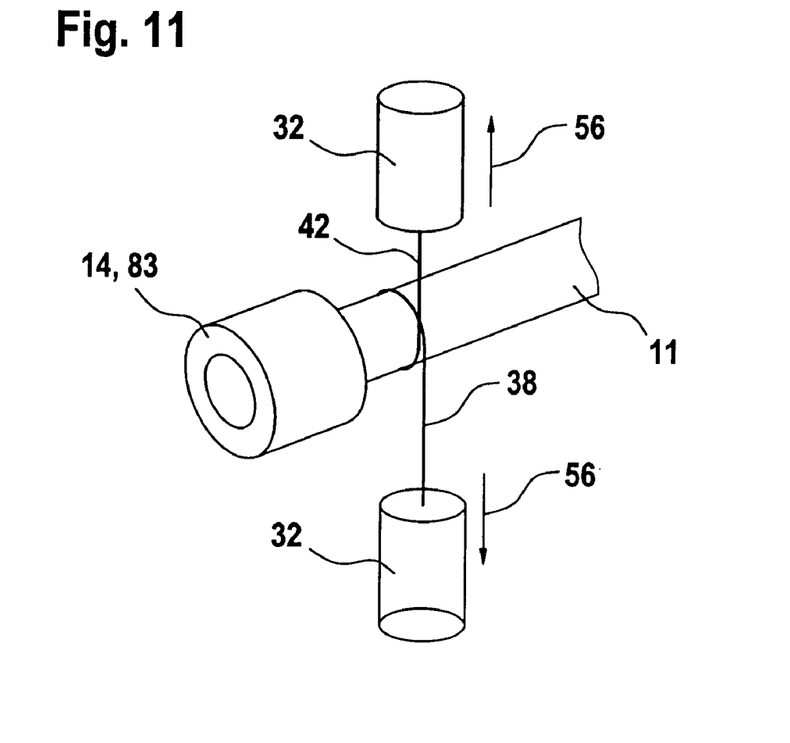
FIG. 11 to FIG. 13 Various spatial arrangements of the disengaging system

FIG. 11 shows another exemplary embodiment, in which the two disengaging systems 32 are arranged radially or tangentially opposing the shaft 11, whereby the two ends 38 and 40 lie on a common straight line. No resulting force 58 is generated on the shaft 11 as a result. The shaft 11 has a frictional wheel 83 for example as an output element 14, which can be held in a specific position by means of the locking device 10. The two disengaging systems 32 lie in a common radial plane so that axial construction space can be saved at the expense of the radial extension.

Figure 12:
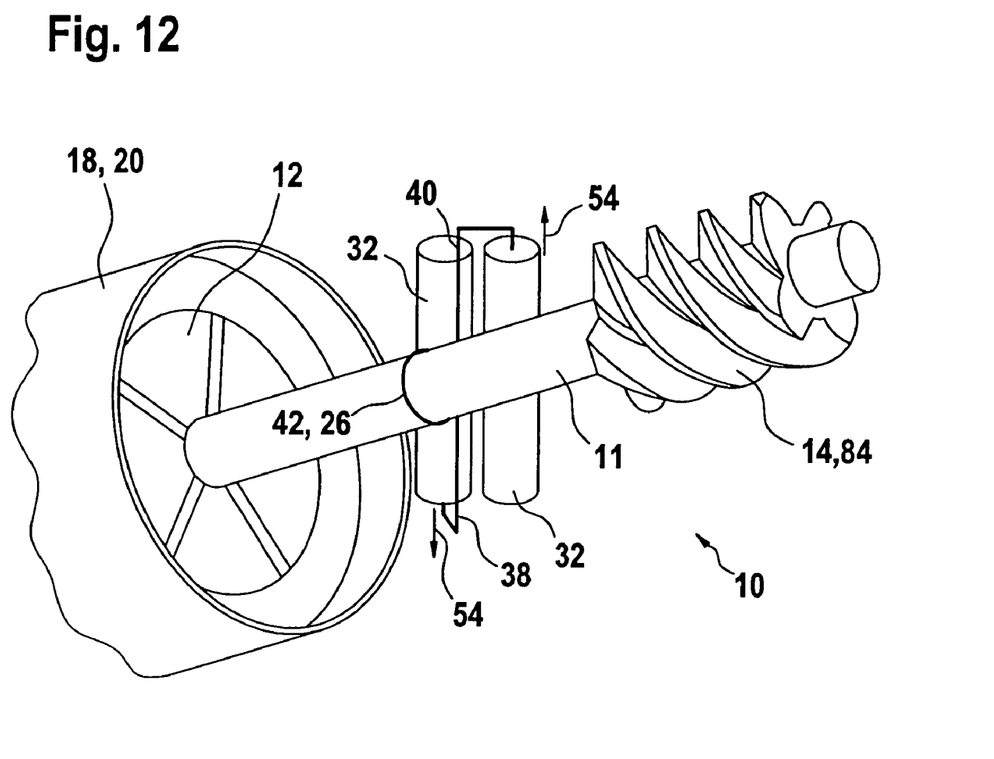

In the exemplary embodiment according to FIG. 12, two disengaging systems 32 are arranged next to one another axial to the armature shaft 11. As a result, the radial construction space is reduced at the expense of the axial extension. In this case the armature shaft 11 features a worm 84, for example, as an output element 14, whose efficiency can be embodied to be far greater than a self-locking worm gear due to the additional locking device 10.

Figure 13:
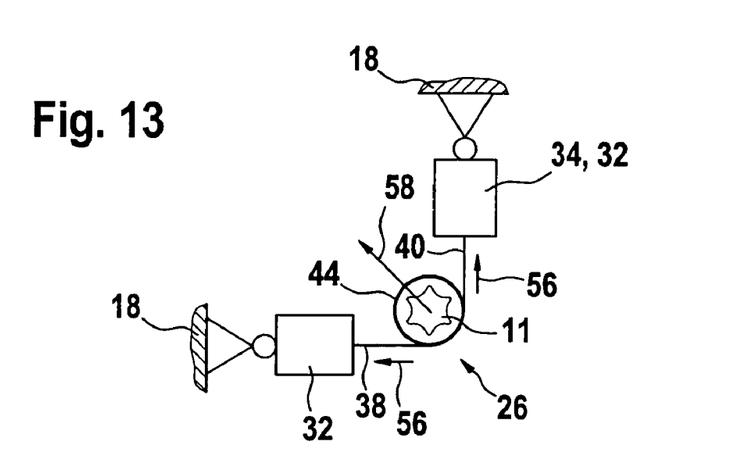

FIG. 13 depicts another variation of an exemplary embodiment, in which the two disengaging systems 32 are arranged in the radial plane at an angle deviating from 180°, for example by approximately less than 90°. The disengaging systems 32 are fastened on the housing 18 so that, in the case of a deflection of the two ends 38 and 40 via the control members 30, a resulting force 58 in the radial direction acts on the shaft 11. This effect is used to generate an additional tilting moment of the shaft 11 against a bearing 16 via the lever arm 60, thereby also blocking the shaft 11 in terms of its rotation.

Figure 14:
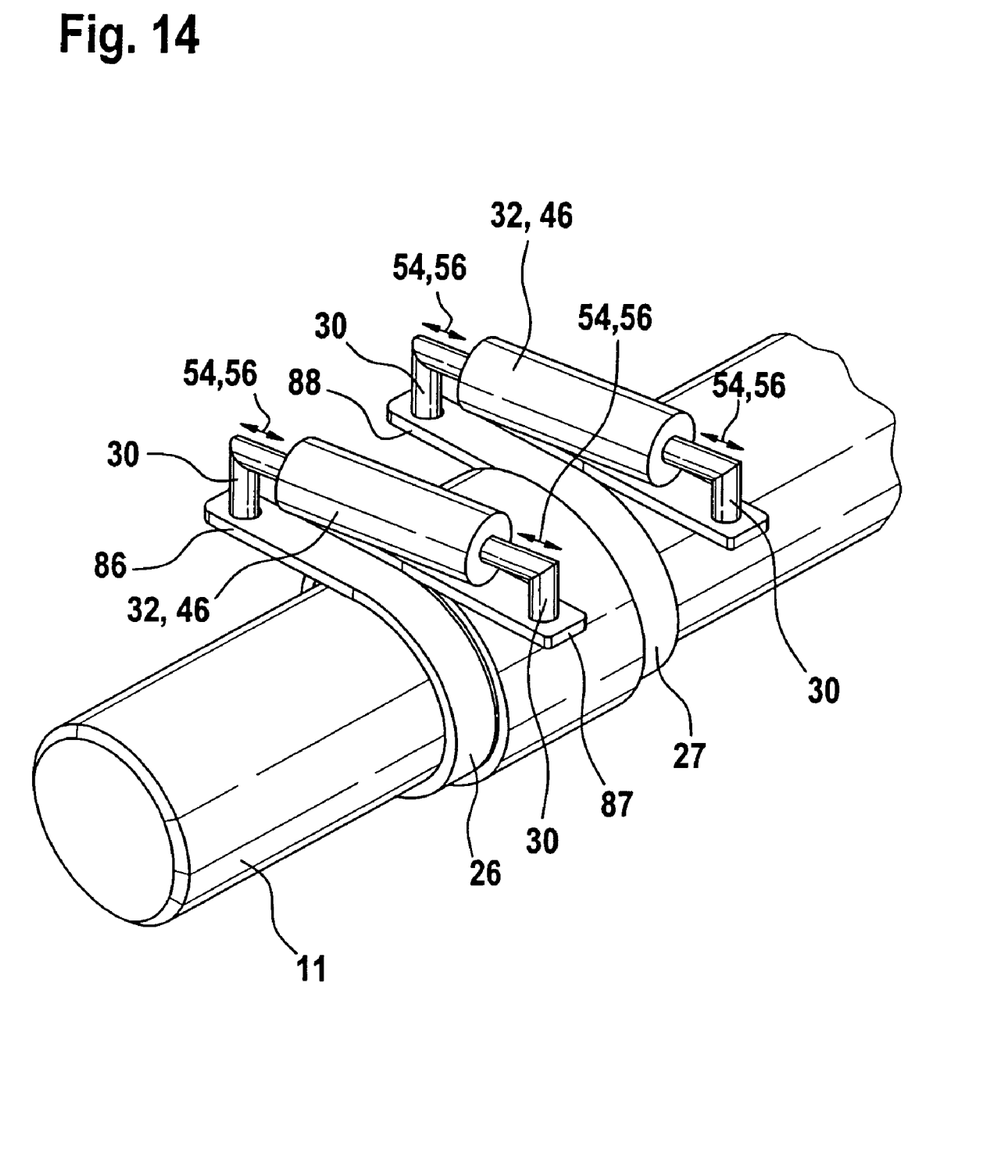
FIG. 14 An exemplary embodiment with two gripping bodies arranged one above the other.

FIG. 14 depicts an arrangement with two gripping bodies 26 wound in opposite directions. The inside surface of the first gripping body 26 is located in the direct effective vicinity of the jacket surface of the shaft 11. A second gripping body 27 surrounds the first at least partially at an axially identical position. In the depicted form, the gripping body 27 has a wrapping length reduced by a winding number of two. This permits the especially efficient effective arrangement of two disengaging systems 32 or of two restoring elements 46 in an active chain with the control members 30 to the respective ends 86, 88 beginning the winding and the ends 87, 89 ending the winding of the two coaxial gripping bodies 26 and 27. Different cross-sectional widths, if need be even variable over the wrapping length, make this arrangement possible even with identical winding numbers. A separate initiation of force 54, 56 without the previously described active chain is also conceivable in a special application case. The number of gripping bodies can be increased further in the manner shown, in particular with a flexible cross-sectional design in combination with a high lateral-thrust deformation capacity of the individual gripping bodies.

It should be noted with respect to the exemplary embodiments depicted in all the figures that diverse combination possibilities of the individual features among one another are possible.

Thus, for example, the cross section 50, 52 as well as the geometric arrangement of both the helical spring 48 as well as the wrap-around band 72 can be varied as desired. In addition, the number of control members 30 as well as their drive mechanisms is variable. As a result, the control members 30 can be adjusted magnetically, electrically, pneumatically or hydraulically, whereby the adjustment path for the ends 38, 40 of the gripping body 26 can be executed as a linear movement or rotational movement. The invention preferably finds application for an engine brake in adjusting drives, however, is not restricted to the securing of armature shafts 11, but can also be used for any shafts or cylinders in various gear devices. Therefore, for example, even axially disengaging cylinders 11 or working lifting magnets can also be held in a specific axial position by means of the gripping body 26. In just the same way, the gripping body 26 can be arranged within a hollow shaft 11 so that it can be held in a specific position by means of an application force that is directed radially towards the outside. The device is suitable in the same way for shafts of electrically commutating motors and of commutator motors with brushes as well as of electrical machines of all types.

The invention claimed is:

1. Device (10) for maintaining the position of a rotatably or displaceably mounted shaft (11) having a surface (44), wherein a gripping body (26) is arranged around the shaft (11), and said gripping body is impinged upon by a force (54, 56) in order to form a friction closure between the gripping body (26) and the surface (44) of the shaft (11), characterized in that the force (54, 56) for maintaining the position is provided by an actively actuated control member (30, 62, 70, 80) that is connected at least to one end (38, 40, 74) of the gripping body (26), that the at least two ends (38, 40, 74) are impinged upon in such a way by the force (54, 56) in order to form the friction closure, that a resulting radial force (58) is generated, which twists the shaft (11) against a bearing point (16) of the shaft (11), whereby the shaft (11) is prevented from rotating by means of an additional holding moment, and that the shaft (11) is deflected radially with respect to the shaft bearing (16) in order to generate an additional tilting moment of the shaft (11) with respect to the bearing (16) via the lever arm (60).

2. Device (10) according to claim 1, characterized in that the gripping body (26) is embodied as a wrap-around band (72) or helical spring (48) with at least two ends (38, 40, 74).

3. Device (10) according to claim 2, characterized in that at least one of the gripping body (26) and the surface (44) of the shaft (11) features a material (78) with an increased coefficient of adhesive friction.

4. Device (10) according to claim 3, characterized in that the gripping body (26) is embodied as a double wrap-around band (72) with two free ends (38, 40) and a loop (74) as a third end (74).

5. Device (10) according to claim 1, characterized in that at least one of the gripping body (26) and/or the surface (44) of the shaft (11) features a material (78) with an increased coefficient of adhesive friction, in particular a rubber-like casing (76).

6. Device (10) according to claim 1, characterized in that the gripping body (26) is embodied as a double wrap-around band (72) with two free ends (38, 40) and a loop (74) as a third end (74).

7. Device (10) according to claim 6, characterized in that the two free ends (38, 40) are arranged axially within the loop (74) of the third end (74).

8. Device (10) according to claim 1, characterized in that the gripping body (26) is fabricated of round wire (50) or a flat band (64).

9. Device (10) according to claim 1, characterized in that the control member (30, 62, 70, 80) is actuated by a disengaging system (32), which has an electric or pneumatic or hydraulic drive (81) with a lifting magnet (34) or a chemical or shape-memory actuator (68).

10. Device (10) according to claim 1, characterized in that the disengaging system (32) has a double lift with two control members (30, 62, 70, 80), which simultaneously deflect at least two ends (38, 40, 74) of the gripping body (26).

11. Device (10) according to claim 1, characterized in that at least one control member (30) is embodied as a wedge (62) or an eccentric wheel (70), which deflects at least one end (38, 40, 74) of the gripping body (26).

12. Device (10) according to claim 1, characterized in that at least one control member (30, 62, 70, 80) executes a linear movement or a rotational movement to deflect at least one end (38, 40, 74).

13. Device (10) according to claim 1, characterized in that the friction closure is caused by pulling tight the gripping body (26) by means of the effect of a tensile force (56) or a compressive force (54) on the ends (38, 40, 74).

14. Device (10) according to claim 1, characterized in that at least one end (38, 40, 74) of the gripping body (26) is fastened on a housing part (18, 20, 22, 24) of the shaft bearing (16).

15. Device (10) according to claim 1, characterized in that the disengaging system (32) features a restoring element (46), which is arranged in such a way that when the disengaging system (32) is activated a friction closure between the surface (44) and the gripping body (26) is prevented.

16. Device (10) according to claim 1, characterized in that the restoring element is arranged in such a way that when the disengaging system (32) is activated a friction closure between the surface (44) and the gripping body (26) is produced.

17. Device (10) according to claim 1, characterized in that two disengaging systems (32) are arranged next to each other axial to the shaft (11), or in a radial plane.

18. Device (10) according to claim 1, characterized in that the gripping body (26,) is surrounded radially at least partially by at least one additional gripping body (27).

19. Device (10) according to claim 1, characterized in that the gripping bodies (26, 27) have opposite winding directions and at least one end (86, 88) beginning the winding is connected to at least one end (87, 89) ending the winding by means of the control member (30) and the disengaging system (32).

* * * * *